UNITED STATES PATENT OFFICE.

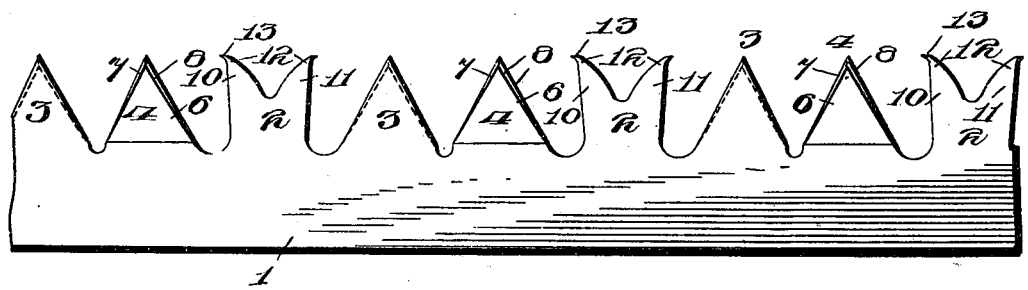

CHARLEY McDONNER, OF APPLETON, WISCONSIN.

SAW.

SPECIFICATION forming part of Letters Patent No. 667,155, dated January 29, 1901.

Application filed December 5, 1900. Serial No. 38,801. (No model.)

*To all whom it may concern:*

Be it known that I, CHARLEY MCDONNER, a citizen of the United States, residing at Appleton, in the county of Outagamie and State of Wisconsin, have invented a new and useful Saw, of which the following is a specification.

My present invention relates to improvements in the construction of crosscut-saws, the object being to produce a saw constructed in a manner to reduce to a minimum the frictional resistance opposed to its movement and to enable a saw to be put in proper condition for use with the least possible amount of filing.

To the accomplishment of these ends the invention consists in the construction and arrangement of the saw to be hereinafter described, illustrated in the accompanying drawings, and defined in the appended claims.

In said drawings, Figure 1 is a side elevation of a portion of my saw. Fig. 2 is an edge view thereof on a somewhat-enlarged scale. Fig. 3 is a sectional view on the line 3 3 of Fig. 2. Fig. 4 is an enlarged view illustrating one of the rakers, and Fig. 5 is a perspective view of so much of a saw as is necessary to show the construction and relative arrangement of a pair of cutting-teeth.

Referring to the numerals employed to designate corresponding parts and features in the several views, 1 indicates a crosscut-saw provided with a series of rakers 2. Intermediate of each pair of rakers are a pair of cutting-teeth 3 and 4 of the usual triangular form, but otherwise having novel configuration, in which is comprehended the most essential feature of my invention. The cutting-teeth 3 and 4 are thinned in gradually-increasing degree from their bases to their points by filing or beveling one side face of each tooth from the base to the point thereof, as best shown in Figs. 3 and 5. This beveled or inclined side face of the tooth 3 I shall designate by the numeral 5, (see Fig. 3,) and the corresponding face of the tooth 4 I shall designate by the numeral 6. By reference to Fig. 5 it will be noted that these teeth are only thinned or beveled upon one side face and that this bevel is produced upon the opposite sides of adjacent teeth, the other side of each tooth being disposed in the plane of the side-face saw. Thus the beveling of the opposite side faces of alternate teeth will impart a true set to the saw, inasmuch as the points of the teeth will be disalined. The cutting edges of saw-teeth are usually formed, as is well understood in the art, by providing a bevel or fleam along the entire side edges of the teeth; but I have found that in practice this is objectionable, for the reason that while a sharp cutting edge is formed on the tooth continuously from the point to the base the bevel or fleam likewise coextensive with the tooth will have a tendency to cause sawdust within the kerf to become wedged between the wall of the kerf and the side of the tooth—that is to say, the entire edge face of the tooth opposed to any sawdust which may be in advance of it is inclined in such a manner that instead of the sawdust being carried forward it simply passes along the inclined face or fleam and becomes wedged against the face of the tooth, greatly increasing the friction opposed to the movement of the saw and interfering with the operation of the latter by impeding the movement thereof. In order to eliminate this objectionable feature of saw constructions while at the same time retaining the sharp cutting edges necessary at the point of the tooth, I provide the edge of each tooth with a half fleam or bevel 7 and 8—that is to say, I impart to each edge of the tooth a bevel which at the point is coextensive with the width of the edge, but which gradually decreases in width to the base of the tooth, as clearly shown in Fig. 5. This will produce sharp cutting edges adjacent to the point of the tooth; but instead of such edge being extended to the base of the tooth, as is ordinary where a full fleam is employed, a flat transverse face 9 will be formed on each edge disposed directly across the path of movement of the saw and diminishing in width from the base of the tooth to the point thereof, as is also clearly shown in Fig. 5. It will therefore appear that as the saw is drawn through the kerf the sawdust instead of being wedged against the side of the tooth will be pushed along in advance of the tooth by the face 9, which latter by reason of the fact that it is disposed directly across the kerf will not have a tendency to wedge the sawdust against the side face of the tooth, as is the case where the entire edge face of the tooth is beveled or transversely inclined with respect to the direction of movement of the saw. By reference to Fig. 5 it will also appear that the half-fleams 7 and 8 are disposed adjacent to the inclined side face of the tooth, which I shall designate as the "front." Therefore as the back of each tooth lies in the plane of the adjacent face of the saw the faces 9 at those points where they are comparatively narrow will be located directly at the opposite sides of the kerf. Consequently the sawdust will be prevented from being wedged against the back of the tooth and will be urged toward the front thereof in order that it may pass in the clearance formed between the inclined front face of the tooth and the adjacent side of the kerf. It should be further noted that as the thickness of the tooth becomes greater toward its base the clearance to which reference has been made becomes less as the sawdust advances from the point toward the base of the tooth; but as the faces 9 increase in width from the point of the tooth toward its base the passage of the sawdust behind the edge of the tooth will be more effectually prevented as the necessity for such prevention becomes greater. In other words, at the point of the tooth, where it is thinnest, there is considerable clearance between its front face and the wall of the kerf. Therefore at its point the transverse face 9 is comparatively narrow, while at the base of the tooth the clearance is much less and the face 9 at this point is proportionately wider, to the end that wedging or sticking of the saw within the kerf is absolutely prevented and at the same time the saw is capable of effecting a given cut in much less time than is ordinarily required.

In Figs. 1 and 4 are clearly shown the rakers 2, which are bifurcated in the usual manner to form raker-teeth 10 and 11, the points of which are swaged before filing, as indicated at 12, and are afterward filed flat, as indicated at 13, to facilitate the movement of the rakers and the consequent removal of the sawdust.

From the foregoing it will be observed that I have produced a novel crosscut-saw embodying a construction which will eliminate the possibility of the wedging or sticking of the saw within the kerf and which will therefore be fast-cutting and will require the application of a minimum of power, also that by reason of the employment of the half-fleam upon the edges of the teeth the saw may be put in condition for use with the least possible amount of filing; but while the present embodiment of the invention is deemed at this time to be preferable I wish to reserve to myself the right to effect such changes, modifications, and variations as may fall properly within the scope of the protection prayed.

What I claim is—

1. A saw formed with a tooth having its back face disposed in the plane of the adjacent face of the saw and its front face in inclined relation thereto to produce a tooth gradually thinned from the base to the point, the edges of said tooth being provided with half fleams or bevels coextensive with the width of the edge at the point of the tooth, and diminishing in width from the point of the tooth to the base thereof at the front or inclined side of said tooth.

2. A saw having alternating teeth provided at opposite sides of the saw with an inclined side face to diminish the thickness of the tooth from its base to its point, the edges of each tooth being provided with a half fleam or bevel coextensive with the width of the edge at the point of the tooth and diminishing in width to the base of the tooth at that side of the edge adjacent to the inclined side face of the tooth.

In testimony that I claim the foregoing as my own I have hereto affixed my signature in the presence of two witnesses.

CHARLEY McDONNER.

Witnesses:
G. T. MOESKES,
HENRY D. RYAN.